W. HINZ.
ARTIFICIAL HORIZON FOR SHIPS OR THE LIKE.
APPLICATION FILED APR. 1, 1911.

1,016,500.

Patented Feb. 6, 1912.

UNITED STATES PATENT OFFICE.

WILHELM HINZ, OF ANTWERP, BELGIUM.

ARTIFICIAL HORIZON FOR SHIPS OR THE LIKE.

1,016,500.	Specification of Letters Patent.	Patented Feb. 6, 1912.

Application filed April 1, 1911. Serial No. 618,374.

*To all whom it may concern:*

Be it known that I, WILHELM HINZ, a subject of the German Emperor, residing at Antwerp, in the Province of Antwerp, Belgium, have invented certain new and useful Improvements in Artificial Horizons for Ships or the Like, of which the following is a specification.

The present invention relates to an artificial horizon for ships or the like consisting of a gimbal-mounted mirror and provided with a pendulum which oscillates in a similarly mounted liquid containing receptacle. With hitherto used constructions of this kind, the above named gimbal-systems have been arranged concentrically relative to one another, so that the oscillations of the mirror and the receptacle vary according to size, direction, time and position of the orbit of oscillation. In consequence thereof, the of itself advantageous gimbal-suspension of the liquid receptacle has been avoided in the old constructions and the receptacle is suspended in its center of gravity or at a point very close to it.

According to the present invention, the two gimbal-systems are arranged concentrically to and on the same level with one another, and the centers of gravity of both these systems are made to as nearly as possible coincide with one another. Hereby both gimbal-systems are caused to always execute precisely the same oscillations at any vibration of the ship, so that a disturbance of the mirror owing to the oscillations of the liquid receptacle does not take place, and only small differences of oscillation have to be corrected by the liquid dampening. The mirror of the new horizon thus adjusts itself horizontally very quietly and easily and damaging effects of friction in the bearings are avoided to the greatest extent.

My invention also has for its object to prevent rapid wearing off and bending of the points of support, and displacement of the center of gravity.

Another object of my invention is to prevent too vehement movements of the liquid during the oscillation of its receptacle.

With these and other objects in view, my invention consists in the construction, combination and arrangement of parts as hereinafter fully specified.

Figure 1:
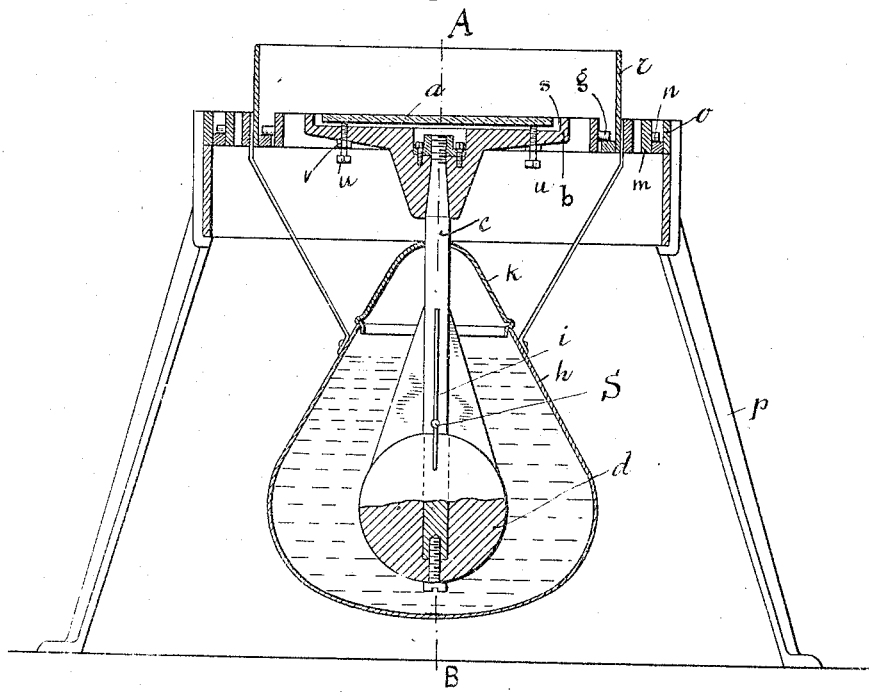
Figure 2:
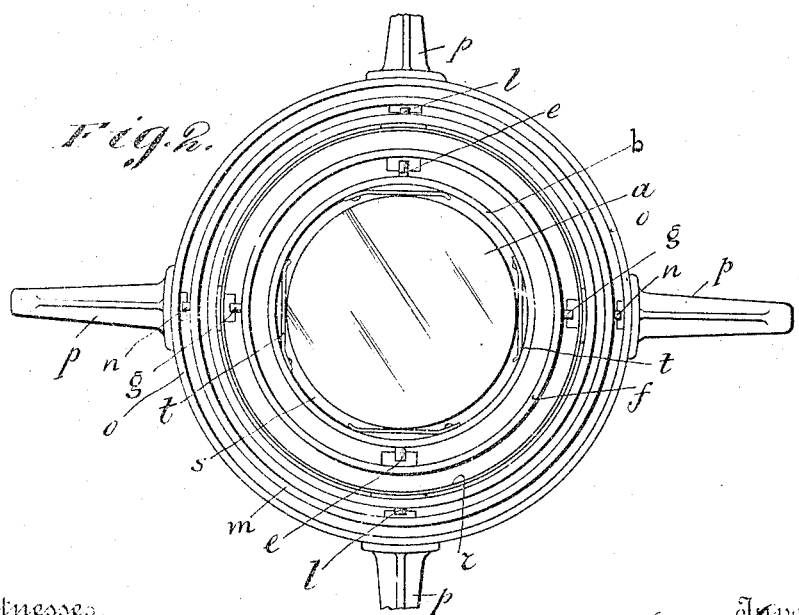

In the accompanying drawing, in which similar reference letters denote corresponding parts, Figure 1 is a vertical section of my instrument and Fig. 2 is a plan view thereof.

In the drawing, which forms a part of this specification, $a$ denotes the mirror serving as artificial horizon. This mirror rests in a frame $b$, from the center of which a rod $c$ fastened thereto extends downwardly and carries at its free end a heavy weight $d$ forming a pendulum. The frame $b$ is rotatively mounted in a ring $f$ by means of knife edges or pivots $e$, which ring in its turn is rotatively mounted in the stationary support by means of knife edges or pivots $g$ arranged at a right angle relative to the pivots $e$, so that the whole forms a gimbal-support for the mirror.

The pendulum $c$, $d$ oscillates in a receptacle $h$, which contains a liquid, as viscid oil, glycerin, or the like, and is provided with dampening wings $i$, adapted to check the oscillations of the pendulum. Of course, instead of such wings any other checking or braking means may be provided. The receptacle $h$ is reduced in size in upward direction, whereby vehement vibrations of the liquid surface will be as much as possible avoided. The upper part $k$ of the receptacle is removable to allow of the insertion of the weight $d$. The receptacle $h$ is rotatively mounted in a ring $m$ by means of pivots $l$ or the like, which ring $m$ in its turn is rotatively mounted in a ring $o$ by means of pivots $n$ arranged at a right angle to the pivots $l$, so that the receptacle, too, is gimbal-mounted in bearings arranged outside of the vertical central axis A—B. The gimbal-support of the mirror and that of the receptacle are located on the same level. Since on the other hand the center of gravity S of the mirror system and that of the receptacle system are calculated to coincide or nearly coincide, the path and time of the oscillations of the mirror and those of the receptacle during the rolling and pitching of the ship will be uniform or nearly so, so that but very small differences in the oscillations will have to be adjusted by the liquid dampening. The ring $o$ is provided with a support $p$, but may be supported in any other suitable manner.

Surrounding the mirror is a metal ring $r$ serving as a wind guard and which may be removed when observing low star altitudes. The mirror $a$ is not rigid within the frame $b$; moreover, there is an annular space $q$ provided around the mirror in which four plate springs *t* are arranged, whereby damaging effects owing to change of temperature are avoided. On the other hand, on the bottom of the frame *b* are set screws *u* with counter nuts *v*, whereby on land or on board during very quiet weather, the mirror can be adjusted precisely in horizontal position.

By means of the plate springs and set screws *n*, the mirror may be adjusted without requiring the disconnection of any parts.

When the instrument is not used, it may, like a chronometer in well known manner, be hung and fixed in a box.

What I claim and desire to secure by Letters Patent is:

1. An artificial horizon, comprising a gimbal-mounted mirror formed with a pendulum and a gimbal-mounted liquid receptacle in which said pendulum oscillates, so arranged that the center of gravity of the mirror system and that of the receptacle coincide.

2. An artificial horizon, comprising a gimbal-mounted mirror formed with a pendulum and a gimbal mounted liquid receptacle in which said pendulum oscillates, so arranged that the gimbal-supports of both the mirror and receptacle are located concentrically on the same level, and the center of gravity of the mirror system and that of the receptacle coincide.

In testimony whereof I affix my signature in presence of two witnesses.

WILHELM HINZ.

Witnesses:
 JOHN T. CARMODY,
 MAX D. ORDMAN.